(12) United States Patent
Sabathe et al.

(10) Patent No.: US 8,794,428 B2
(45) Date of Patent: Aug. 5, 2014

(54) MATERIALS HANDLING DEVICE SUITED TO THE TRANSFER AND STORAGE OF TIRE CARCASSES

(75) Inventors: Guy Sabathe, Nohanent (FR); Francis Marti, Cebazat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 218 days.

(21) Appl. No.: 13/389,230

(22) PCT Filed: Jul. 23, 2010

(86) PCT No.: PCT/EP2010/060735
§ 371 (c)(1),
(2), (4) Date: Sep. 17, 2012

(87) PCT Pub. No.: WO2011/015471
PCT Pub. Date: Feb. 10, 2011

(65) Prior Publication Data
US 2013/0075233 A1    Mar. 28, 2013

(30) Foreign Application Priority Data

Aug. 6, 2009  (FR) ..................................... 09 55523

(51) Int. Cl.
*B65G 29/00*  (2006.01)
(52) U.S. Cl.
USPC .......................................... 198/624; 198/394

(58) Field of Classification Search
USPC ............ 198/383, 385, 377.02, 377.06, 377.1, 198/378, 379, 394, 399, 400, 608, 624, 780
See application file for complete search history.

(56) References Cited

U.S. PATENT DOCUMENTS

| 3,463,293 | A  | * | 8/1969  | Lederer ......................... 198/399 |
| 4,686,895 | A  |   | 8/1987  | Ishino et al. |
| 4,789,290 | A  | * | 12/1988 | Barnhart et al. ........... 414/798.4 |
| 5,127,509 | A  | * | 7/1992  | Kohlen et al. .............. 198/345.3 |
| 7,287,951 | B2 | * | 10/2007 | Blattner ........................ 414/757 |
| 7,306,086 | B2 | * | 12/2007 | Boelaars ................... 193/35 SS |
| 2010/0108467 | A1 | * | 5/2010 | Barreyre et al. .............. 198/599 |

FOREIGN PATENT DOCUMENTS

| DE | 195 32 323   | 3/1997 |
| EP | 0 659 542    | 6/1995 |
| SU | 1 154 015    | 5/1985 |
| WO | WO 02/18122  | 3/2002 |

* cited by examiner

*Primary Examiner* — James R Bidwell
(74) *Attorney, Agent, or Firm* — Cozen O'Connor

(57) ABSTRACT

Storage or handling device comprising at least one pair of rollers (11), the axes (rr') of which are mutually parallel and are arranged a suitable distance (d) apart such that they can support a carcass (2) of substantially cylindrical shape of a tire that is in the process of being manufactured. The rollers (11) are mounted on a chassis (12) and are driven in rotation in the same direction (R) about their respective axes (rr'). One of the rollers (11) of said pair has a radial profile of sinusoidal overall shape comprising a succession of crests and of troughs, and the other roller of the pair has a cylindrical overall profile.

6 Claims, 2 Drawing Sheets

Fig 1
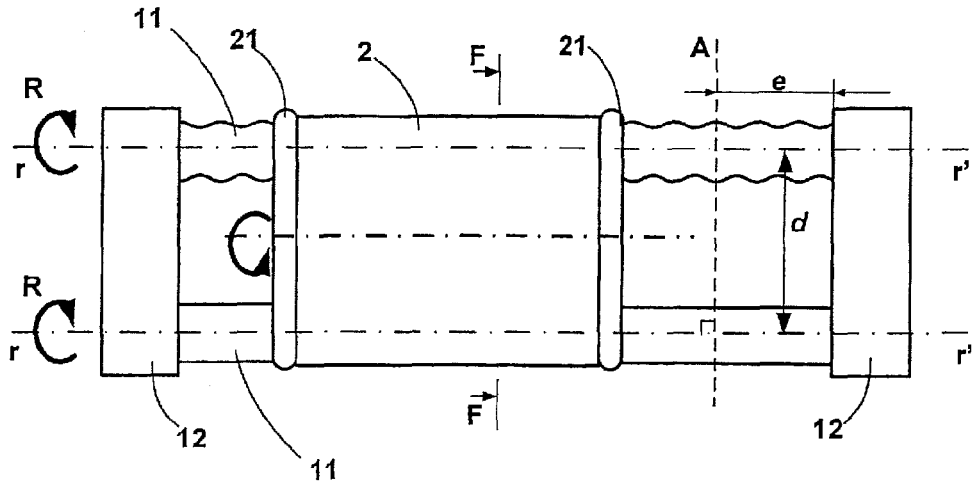
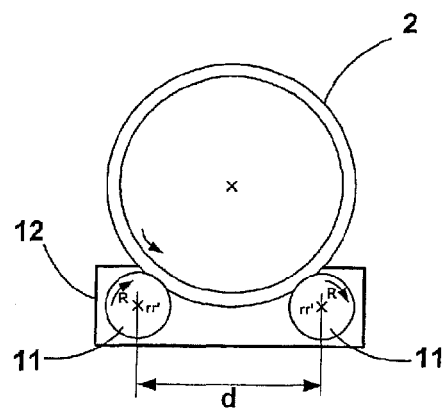
Fig 2
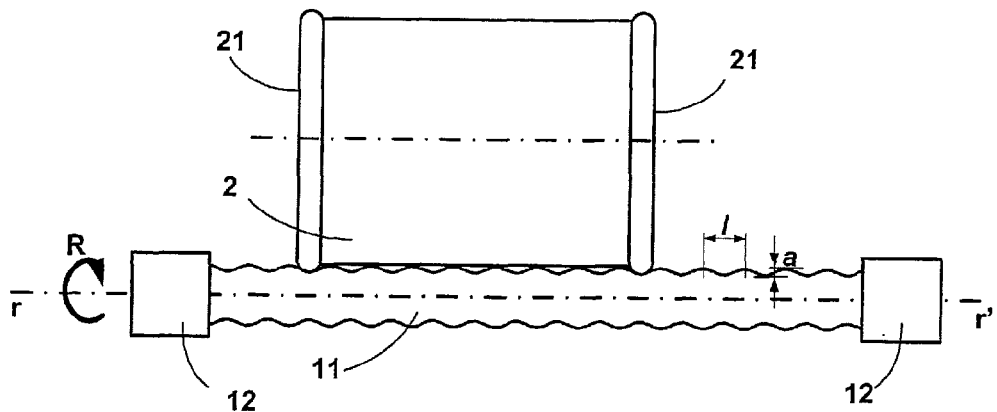
Fig 3

MATERIALS HANDLING DEVICE SUITED TO THE TRANSFER AND STORAGE OF TIRE CARCASSES

RELATED APPLICATIONS

This is a U.S. National Phase Application under 35 USC 371 of International Application PCT/EP2010/060735, filed on Jul. 23, 2010.

This application claims the priority of French patent application Ser. No. 09/55523, filed Aug. 6, 2009, the entire content of which is hereby incorporated by reference.

FIELD OF THE INVENTION

The invention relates to the field of tire manufacture and in particular to that of the materials handling device used for transferring and storing tire carcasses within the tire-building workshops.

BACKGROUND OF THE INVENTION

According to certain tire-building methods, tire manufacture can be broken down into two distinct steps. In a first step, the components comprising the carcass reinforcing ply and the bead reinforcing rings is built up on a drum, generally a cylindrical drum, to obtain a substantially cylindrical assembly often given the name carcass by extension of the name of one of its key components.

In a second step, the carcass is given a substantially toroidal shape and the components that form the crown reinforcing belt, notably including the crown reinforcing plies and the tread, are added.

These two operations are performed in different tire-building machines, and so it has been necessary to develop transfer means that allow the carcasses to be stored and moved around from the carcass-building machine to the crown-building machine.

These various means comprise, amongst other things, roller conveyors of the type like the one described in publication EP 659 542, on which the carcasses are place and stored while they are waiting to be taken up by the crown-building machine.

As a general rule, and to avoid deformation connected with the low rigidity of the carcass reinforcing ply, the carcasses are placed on the said conveyors in such a way that their axis is positioned horizontally, and perpendicular to the direction in which the carcass travels on the roller conveyor. The carcasses therefore rest directly on one of their generatrices.

However, when they are placed in this position, the carcasses experience deformation connected firstly with the effects of gravity.

One known solution, as described in publication WO 02/1822, is therefore to have the said carcasses rotating about their axis of revolution so that the effects of gravity are applied uniformly to all points on the circumference of the carcass.

To do that, the rollers of the conveyor are driven in rotation about their axis of rotation and are capable of translational movement in the direction in which the carcasses travel, which direction is perpendicular to the said axis of rotation of the rollers. These two movements of rotation and of translation of the rollers can be controlled independently of one another.

However, it is found that, while the carcasses are revolving on the roller conveyor, the carcasses deviate from their path in an axial direction (perpendicular to the direction of travel) because of slight geometric variations affecting their cylindrical overall shape. This then causes undesirable contact between the carcasses and one of the edges of the conveyor or between carcasses themselves, when they are positioned in line abreast across a wide conveyor. These contacts are likely to cause deformation to the unvulcanized elastomers of which the tire carcass in the process of being manufactured is made.

More generally, the problem as set out hereinabove also arises in respect of any device comprising at least one pair of rollers intended to support a tire carcass and in which the said rollers are set in rotation such that the carcass rotates about its axis in order not to experience deformations connected with the action of gravity.

SUMMARY OF THE INVENTION

It is an object of the invention to provide a solution to the above-described problem.

This and other objects are attained in accordance with one aspect of the invention directed to a device comprising at least one pair of rollers, the axes of which are mutually parallel and are arranged a suitable distance apart such that they can support the carcass of substantially cylindrical shape of a tire that is in the process of being manufactured. The rollers are mounted on a chassis and are driven in rotation in the same direction about their respective axes. This device is characterized in that at least one of the rollers of the pair has a radial profile of sinusoidal overall shape comprising a succession of crests and of troughs.

The bead reinforcing rings situated at the two axial ends of the carcass preferably position themselves in the troughs of the rollers, thereby preventing any axial movement of the carcass on the device.

BRIEF DESCRIPTION OF THE DRAWINGS

FIG. 1 is a view from above of a device according to an embodiment of the invention, FIG. 2 is a view in cross section (on FF) of the device shown in FIG. 1, FIG. 3 is a front view of the device shown in FIG. 1.

DETAILED DESCRIPTION OF THE DRAWINGS

Figure 4:
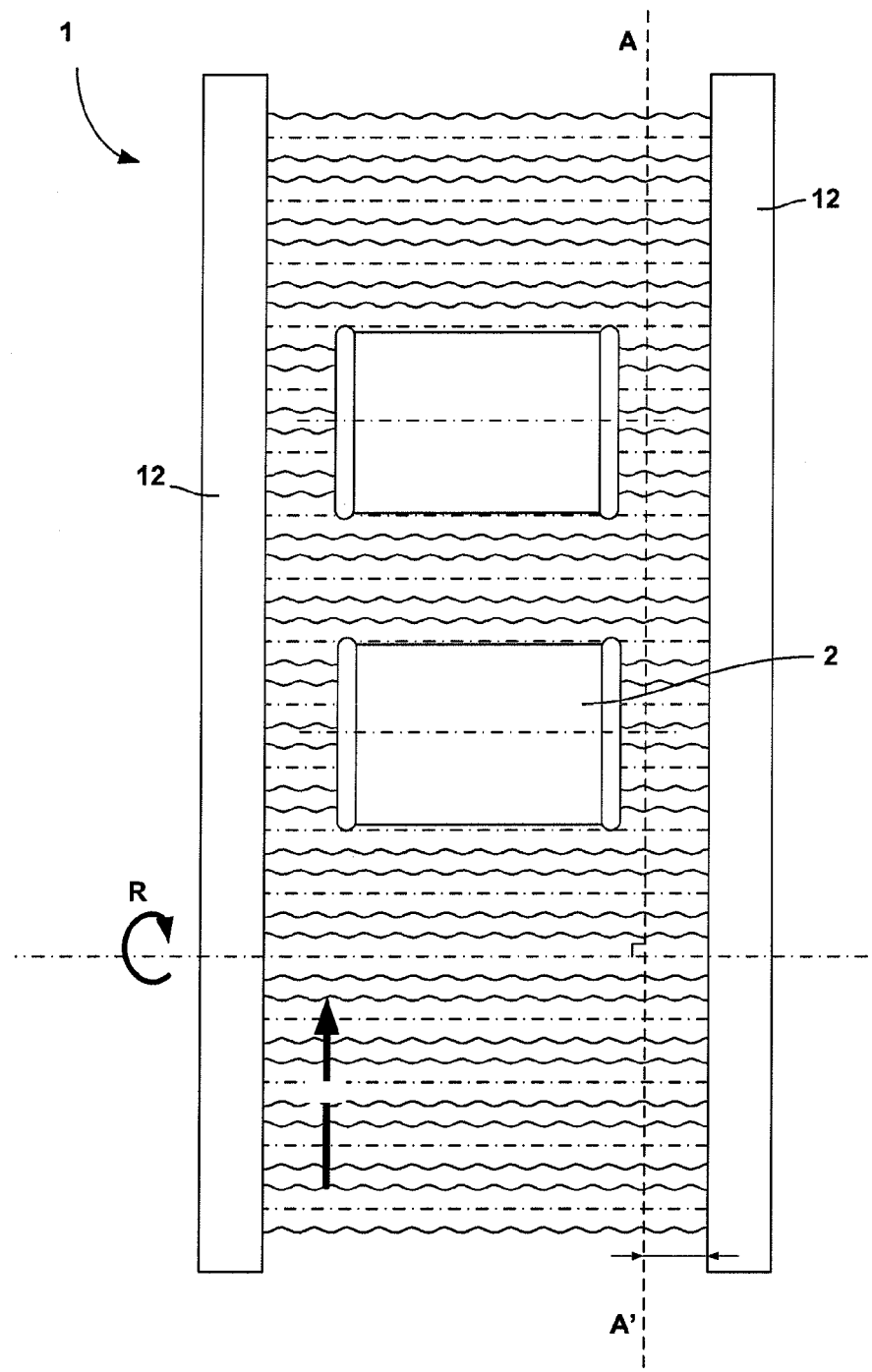
FIG. 4 is a view from above of a conveyor formed of pairs of rollers according to an embodiment of the invention.

The device depicted in FIGS. 1 to 3 comprises a pair of rollers 11 mounted on a chassis 12. The rollers are mounted on the chassis 12 in such a way that the axes rr' of the said rollers are mutually parallel and positioned a distance d apart that is suited to being able to support the carcass 2 of a tire that is in the process of being manufactured.

Each of the rollers is driven in rotation about its axis in the same direction of rotation R. Alternatively, it is also possible to motorize just one of the two rollers of the pair, the other roller being turned by the movement of the carcass.

The means that cause the rotational and translational movements of the rollers are made up of a set of transmission chains and sprockets of conventional design.

The radial profile of at least one of the rollers of the pair, this being understood as meaning the profile of the intersection of the external shape of the roller with any plane that passes through the axis rr' of the said roller, is of a sinusoidal or even wavy overall shape comprising crests and troughs.

One alternative embodiment would be to form a pair of rollers in which one of the rollers has a radial profile of sinusoidal overall shape and in which the other roller has a cylindrical overall shape. The desired effect, specifically holding the carcass in position in the axial direction, is still assured by the roller that has the sinusoidal profile.

When both rollers of the pair have a radial profile with the same sinusoidal overall shape, the rollers are mounted on the chassis 12 so that the troughs (or the crests) situated the same distance e from one edge of the chassis form an alignment AA' perpendicular to the axes of the rollers.

FIG. 3 illustrates a front view of the device of FIG. 1. The distance/between two consecutive crests (or between two consecutive troughs) may usefully be between 25 mm and 50 mm.

Likewise, the depth or amplitude a between a crest and a trough may usefully be between 5 mm and 10 mm.

These values are given by way of indication and are adapted to suit the size of the carcasses that are to be transferred, and in this particular instance correspond to values that have yielded good results for tire carcasses of commonplace dimensions intended to be fitted to passenger vehicles or heavy goods vehicles.

FIG. 3 shows that the bead reinforcing rings 21 naturally position themselves in the troughs of the rollers which then act like rails to deprive the carcass of any unwanted axial movement.

The choice of values for l and a may be relatively standard according to the category of tire carcass in the process of being manufactured. Specifically, only one of the two carcass bead reinforcing rings needs to be profiled as indicated in the present invention in order for the said carcass to be held satisfactorily in position on the device.

The diameter of the rollers corresponds to the standard diameters used for this type of materials handling device and may usefully be between 50 mm and 70 mm.

The rollers of the type according to the invention can easily be produced by slipping a sleeve of sinusoidal profile over a standard commercially available roller.

The distance d between the axes rr' of the rollers is likewise dependent on the diameter of the carcasses, but it is found that by choosing a value for d that is between 15 cm and 40 cm, the device can very well be used for carcasses of diameters ranging between 13" and 21", and which correspond to the range of tires intended to be fitted to passenger vehicles. By way of example, a spacing d of 35 cm is suitable for 17" tire carcasses. For heavy goods vehicle tire carcasses that have a larger diameter, it is possible to extend this distance out to a value of 50 cm or even 55 cm for the very big heavy goods vehicles where this type of transfer means reaches the limit of its use because of the great weight of these carcasses.

The simplified device that forms the subject of the present description can be varied in a number of ways.

FIG. 4 depicts a storage conveyor formed of a plurality of pairs of rollers such as those described hereinabove. The axes of any two consecutive rollers are spaced apart by a distance d. The rollers are driven with a translational movement in a direction P perpendicular to the axes rr' of the said rollers and which corresponds to the direction in which the tire carcasses travel on the said conveyor.

As a general rule, the axes of the rollers are positioned in one and the same plane.

A person skilled in the art will easily be able to combine the teachings of the present description and arrange the pairs of rollers in such a way that the carcasses can all simultaneously be rotated on the one hand, but on the other hand have at least one roller with a sinusoidal profile in contact with the beads so as to prevent any axial movement of the carcass on the said conveyor.

This type of conveyor can also be fitted out so that it can accommodate a number of tire carcasses in line abreast. To do that, all that is required is for the length of the rollers to be increased. The device according to the invention therefore proves particularly beneficial in that it prevents carcasses arranged in one and the same row from coming into axial contact with one another.

Likewise, it is possible to conceive a system with a large storage capacity, in which system several conveyors of this type are arranged vertically one above the other.

The invention claimed is:

1. A storage or handling device comprising at least one pair of rollers, the axes of which are mutually parallel and are arranged a suitable distance apart such that they can support a carcass of substantially cylindrical shape of a tire that is in the process of being manufactured, said rollers being mounted on a chassis and driven in rotation in the same direction about their respective axes, wherein one of said rollers of said pair has a radial profile of sinusoidal overall shape comprising a succession of crests and of troughs, and the other roller of said pair has a cylindrical overall profile.

2. The device according to claim 1, wherein the length between two consecutive crests is between 25 mm and 50 mm.

3. The device according to claim 1, wherein the amplitude between a crest and a trough is between 5 and 10 mm.

4. The device according to claim 1, wherein just one of the rollers of said pair is driven in rotation by a motorized drive means and wherein the other roller of said pair is free and revolves about its axis under the effect of the rotation of the carcass.

5. The device according to claim 1, comprising a plurality of pairs of rollers arranged in such a way that the axes of any two consecutive rollers are mutually parallel and separated by a space, and wherein the rollers are driven with a translational movement in a direction P perpendicular to the axes of the rollers so as to form a conveyor, the direction of travel of which corresponds to the direction P.

6. The device according to claim 5, wherein the axes of the rollers are substantially coplanar.

* * * * *